United States Patent
Baudel et al.

(10) Patent No.: US 9,798,973 B2
(45) Date of Patent: Oct. 24, 2017

(54) EFFICIENT RULE EXECUTION IN DECISION SERVICES

(71) Applicant: INTERNATIONAL BUSINESS MACHINES CORPORATION, Armonk, NY (US)

(72) Inventors: Thomas Baudel, Paris (FR); Pierre D. Feillet, Gentilly (FR)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 13/969,135

(22) Filed: Aug. 16, 2013

(65) Prior Publication Data

US 2014/0058995 A1  Feb. 27, 2014

(30) Foreign Application Priority Data

Aug. 23, 2012 (GB) .................. 1215021.5

(51) Int. Cl.
G06N 5/02 (2006.01)

(52) U.S. Cl.
CPC .............. *G06N 5/02* (2013.01); *G06N 5/025* (2013.01)

(58) Field of Classification Search
None
See application file for complete search history.

(56) References Cited

U.S. PATENT DOCUMENTS

| | | | |
|---|---|---|---|
| 6,272,482 B1 * | 8/2001 | McKee | G06N 5/04 |
| | | | 705/7.37 |
| 7,379,926 B1 | 5/2008 | Belniak et al. | |
| 7,529,760 B2 * | 5/2009 | Jennery | |
| 7,580,878 B1 | 8/2009 | Nieto | |
| 8,073,801 B1 | 12/2011 | Von Halle et al. | |
| 8,108,301 B2 | 1/2012 | Gupta et al. | |

(Continued)

FOREIGN PATENT DOCUMENTS

| | | |
|---|---|---|
| CN | 102184234 A | 9/2011 |
| EP | 2447900 A1 | 5/2012 |
| WO | 2012012577 A2 | 1/2012 |

OTHER PUBLICATIONS

Jorge, Alipio. "Hierarchical clustering for thematic browsing and summarization of large sets of association rules." Proceedings of the 2004 SIAM International Conference on Data Mining. Society for Industrial and Applied Mathematics, 2004.*

(Continued)

*Primary Examiner* — Kakali Chaki
*Assistant Examiner* — Eric Nilsson
(74) *Attorney, Agent, or Firm* — Law Office of Jim Boice

(57) ABSTRACT

A method, system, and/or computer program product performs rule execution in decision services. One or more specialized rulesets classified by decision partitions are based on defined clustering predicates of decision service signatures for business rules. A decision request is received from a client, and one or more parameters of the decision request are input to a clustering predicate based on decision service signatures to produce a decision category. A specialized ruleset for the decision request is determined based on the decision category, and the decision request is forwarded for processing to the specialized ruleset. A decision input is then returned from the specialized ruleset.

16 Claims, 4 Drawing Sheets

(56) References Cited

U.S. PATENT DOCUMENTS

2005/0021911 A1* 1/2005 Moyer ................. G06F 12/121
　　　　　　　　　　　　　　　　　711/128
2006/0095394 A1　　5/2006 Miller et al.
2007/0094201 A1　　4/2007 Dejean
2008/0177689 A1* 7/2008 Jeng et al. ...................... 706/47
2008/0288305 A1　11/2008 LaLuzerne et al.
2010/0223211 A1　　9/2010 Johnson et al.
2011/0302239 A1* 12/2011 Grateau ............ G06F 17/30082
　　　　　　　　　　　　　　　　　709/203

OTHER PUBLICATIONS

GB Application No. GB1215021.5—Search Report Mailed Dec. 5, 2012.
Taylor, J., "Business Rules and Decisioning for Process Experts", White Paper, Decision Management Solutions, 2010, pp. 1-19.
Angela Eager, "FICO Blaze Advisor 6.7", Butler Group, Sep. 2009, pp. 1-11.
Nainani, B., et al., "Building Flexible Enterprise Processes Using Business Rules and BPEL Process Manager", White Paper, Oracle Corporation, Jan. 2005, pp. 1-11.

* cited by examiner

EFFICIENT RULE EXECUTION IN DECISION SERVICES

This application is based on and claims the benefit of priority from Great Britain (UK) Patent Application 1215021.5, filed on Aug. 23, 2012, and herein incorporated by reference in its entirety.

BACKGROUND

This invention relates to the field of decision services. In particular, the invention relates to efficient rule execution in decision services.

A decision service is an autonomous component serving decision requests and returning decision outputs based on decision logic. This is typically operated with business rules and a rule engine.

Decision services may be applied in the area of middleware and large enterprise software, including service oriented architectures, software-as-a-service architectures, web services, decision management and business process management. There is a need in the domain of decision services to increase their performance and scalability.

A ruleset in a decision service is a stand-alone executable container that can be used by a rule engine. It contains a set of rules and rule artifacts that will be executed by the rule engine. A ruleset organizes and stores the rules that are related to a given business decision.

Automation of decision processing based on large rulesets remains a challenge in terms of performance and scalability. The size of rulesets executed in decision services reaches tens of thousands of rules and is increasing up to millions in rising high volume personalization applications.

The authoring and governance of high volume of business rules results commonly in the deployment of a single monolithic ruleset to take a decision. Despite the fact that monolithic packaging is the most convenient way, this approach introduces several difficulties at runtime including the following:

A significant startup time: loading all the rules to handle all business cases to process only one is more expensive compared to the time needed for one case only;

A larger footprint: the monolithic multipurpose ruleset requires memory and CPU to run all the rules even if a subset of them may be eligible for a particular business case; and A longer execution time: depending on optimization of the rule engine the execution performance may be deeply impacted by the ruleset size even if only a subset is used.

The usual response to get execution scalability to serve multiple requests in parallel is to put in place a pool of engines running a ruleset on a unique machine or a cluster. A decision request is sent to the cluster that routes it to a node to be processed with the expected ruleset. This distribution strategy is efficient to get scalability to handle multiple requests but does not address the challenges raised by a high volume monolithic ruleset. When (re)starting a cluster member, and moreover when starting a full cluster in disaster recovery, the monolithic ruleset approach requires to fully load the decision resources even if requests to serve concern only a particular business case.

Cost to start-up a large monolithic ruleset remains high when a machine is restarted or when the ruleset is garbaged. In this case ruleset and engine caching/pooling strategies are inefficient. Due to this, a web site leveraging a rule based decision service may need a few minutes or tens of minutes depending on the implementation and the ruleset complexity to be up and running Classical cluster strategy does not solve either the start-up time of a large monolithic ruleset. This approach increases the execution scalability but performances remain limited by the intrinsic performance of a large monolithic ruleset due to its rule and condition evaluation complexity.

There is also significant evaluation cost due to the fact that many rules with their conditions and tests are packaged in the same runtime container with a single lifecycle.

Therefore, there is a need in the art to address the aforementioned problems.

SUMMARY

A method, system, and/or computer program product performs rule execution in decision services. One or more specialized rulesets classified by decision partitions are based on defined clustering predicates of decision service signatures for business rules. A decision request is received from a client, and one or more parameters of the decision request are input to a clustering predicate based on decision service signatures to produce a decision category. A specialized ruleset for the decision request is determined based on the decision category, and the decision request is forwarded for processing to the specialized ruleset. A decision input is then returned from the specialized ruleset.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention will now be described, by way of example only, with reference to the following drawings in which.

DETAILED DESCRIPTION

Figure 1:
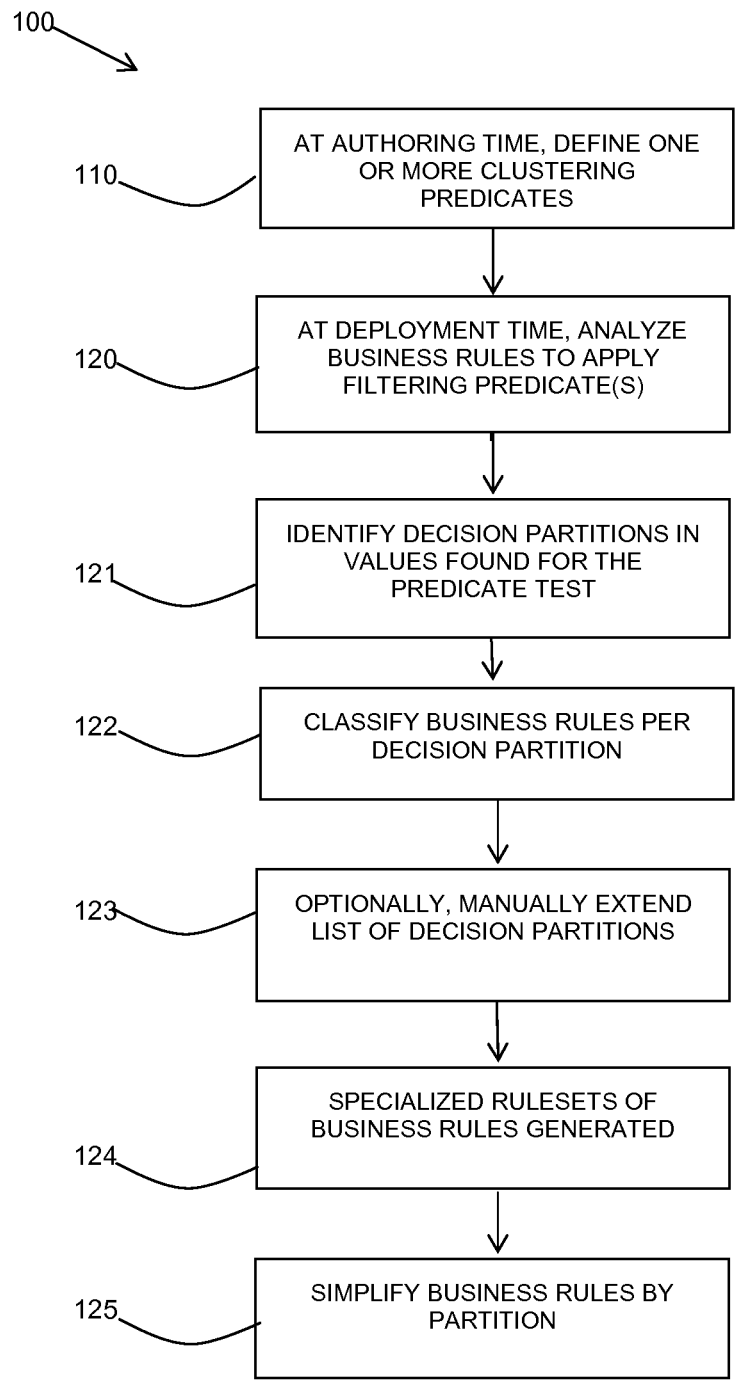
FIG. 1 is a flow diagram of an example embodiment of an aspect of a method in accordance with the present invention carried out at authoring time.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Method and system are provided for decomposing a large monolithic decision service ruleset into smaller execution units and dispatching a decision request across them depending on the business case to process.

The described method builds rulesets per category of decision from a monolithic base of business rules. In this approach, a clustering predicate is defined to categorize the rules, and rewrite them into specialized rule sets. This rewriting can be seen as an alteration, or transformation of the authored business rules.

A decision service signature defines input parameters, output parameters and other information to provide a contract for the decision service. Clustering predicates may be defined at business rule authoring time based on the decision service signature. The clustering predicates are then used at execution time to determine which ruleset a decision request applies to. Consistent logic is used between the ruleset extraction from a set of rules and the request dispatcher to a particular ruleset; however, different filtering functions for the clustering predicate may be used.

This decomposition of the decision services leverages the fact that they are made of introspectable business rules, which allows for separating rules based on the type of tests they perform, and for constructing pre-execution request dispatchers.

The described method decomposes a monolithic multi-purpose ruleset into a dispatcher and a cluster of specialized rulesets coming with a system to combine these components in respect of the decision logic of the original ruleset.

The dispatch relies on a clustering predicate selected by a business analyst at business rule authoring time. This dispatch logic is then executed to route a decision request to the specialized ruleset that applies to the detected business case.

The specialized rulesets can be run locally or distributed over several process and machines.

The described method and system are implemented in the context of an Operational Decision Management and a Business Rule Management System; however, they are applicable to a wider variety of contexts, as long as the following elements are featured in the system:
- A Decision Service (DS): an autonomous component serving decision requests and returning decision outputs based on decision logic. This policy is typically operated with business rules and a rule engine.
- A Ruleset: a ruleset is a stand-alone executable container that can be used by a rule engine. It contains a set of rules and rule artifacts that will be executed by the rule engine. A ruleset organizes and stores the rules that are related to a given business decision.

The fact that decision services are made of rules, which comprise guards, which are sets of tests on the input, is leveraged in the implementation. Rules are introspectable, so that, given a ruleset, it is possible to extract portions of the ruleset that relate to a particular test, either positively or negatively.

EXAMPLE

The following example is referenced in the description to illustrate the method and system. Consider a US insurance company who models a business policy and automates it with business rules. An insurance policy will be defined as a core logic that always applies whatever the customer's US state. Business rules will then be specialized by state for US.

A direct approach consists of implementing the full business policy in one large monolithic ruleset. It facilitates the modeling and the authoring of the business rules. Nevertheless, it implies the loading of all the business rules for all US state cases to process a request for only one US state that requires a subset of them.

The described method and system allow a business analyst to express a business predicate, in this case "the applicant state". US state values are scanned from the business rules and possibly edited by the business analyst. At deployment time this predicate is applied on the business rules to produce a request dispatcher embedding it and a cluster of specialized rulesets, one per US state.

At runtime, consider a request of an applicant living in California. The request is sent to the Decision Service. Internally the dispatcher applies the predicate on the applicant parameter to identify the US state. It finds "California" and redirects the request specialized for this state. The ruleset executes the business rules and returns the decision to the caller involving fewer resources for a decreased start-up and execution time.

Test rewriting and reduction in the business rules implies that the data states are constant during the execution of the decision service. A dispatch predicate must return the same result from the start to the end of the execution of the ruleset. (For example, the applicant state will be California for the whole decision, applicant.getState( )==USState.CA remains stable for the all decision cycle).

Referring to FIG. 1, a flow diagram 100 shows an embodiment of the described method carried out at authoring time.

At authoring time, a business analyst may define 110 one or more clustering predicates which are highly discriminating in their decision logic and are based on a decision service signature. A "clustering predicate" is defined as meaning a function that accepts as input parameters determines a category from the parameters. This clustering predicate is applied to the business rules to partition the rules into rulesets. This clustering predicate is also applied to decision requests to determine a category of decision for which there is a ruleset. For example, a predicate can return a US state category based on the customer zip code given in input. This function typically identifies a category of decision based on parameters passed in the decision request. This enables clustering or categorizing of decisions.

At deployment time, business rules are analyzed 120 to apply the filtering predicate(s) on every business rule authoring model artifact.

Decision partitions 121 may be identified in the values found for the predicate test (for example, applicant.getState( )==USState.CA). Business rules may be classified 122 into categories as per the decision partition. A business analyst may potentially manually extend 123 list of decision partitions when they do not surface in the rule conditions.

Decision partitions (or categories) may be written explicitly in the business rules. For example, all US states can be mentioned in the rules. In some cases they are not explicitly written and a business user may write aside of the rules to add to the list of decision categories. Additionally, a business user may add one or several predicates to classify business rules in this ad hoc decision category, based on decision service input parameters.

A category list may be qualified as complete or open. A complete list means that all categories are known at authoring time, and that requests will always be routed to one of these categories. If this is not the case, the system would raise an error. When the list remains open, categories may be added at runtime. In this case, when a request comes with an unknown category dispatcher it routes it to the default ruleset, which is the monolithic one.

Specialized rulesets of partitioned business rules 124 may be generated. Depending on their conditions and tests, the business rules are listed to be packaged in rulesets specialized to apply to a particular decision partition or category. Business rules may then be simplified by partition or category 125 by factorizing the predicate tests that apply to the partition (for example, applicant.getState( )==USState.CA).

A static scan of partitions and their related business rules is described as follows:

```
For all business rules
    add rule to default partition
For all conditions in business rule
    add condition to the rule in the default partition
For all tests in condition
    if test is performed on a partition then
        if partition not created then add partition
            if rule not added to partition then
                add rule to this partition
                add this test to this rule in the partition
            add test to default partition
        End
    End
End
For all partitions including default
For all business rules with a test in the partition
    Subtract the test from the business rule
        add business rule to the specialized ruleset
    End
End
```

Other ruleset alterations may be performed through further analysis. These may include:

Removing rules that test against another value (checking that the state is immutable for this attribute). As an example, a rule with a test like applicant.getState( )==USState.NJ may be removed from a decision category where applicant.getState( ) is already defined as USState.CA.

Reordering of tests, conditions and rules.

Figure 2:
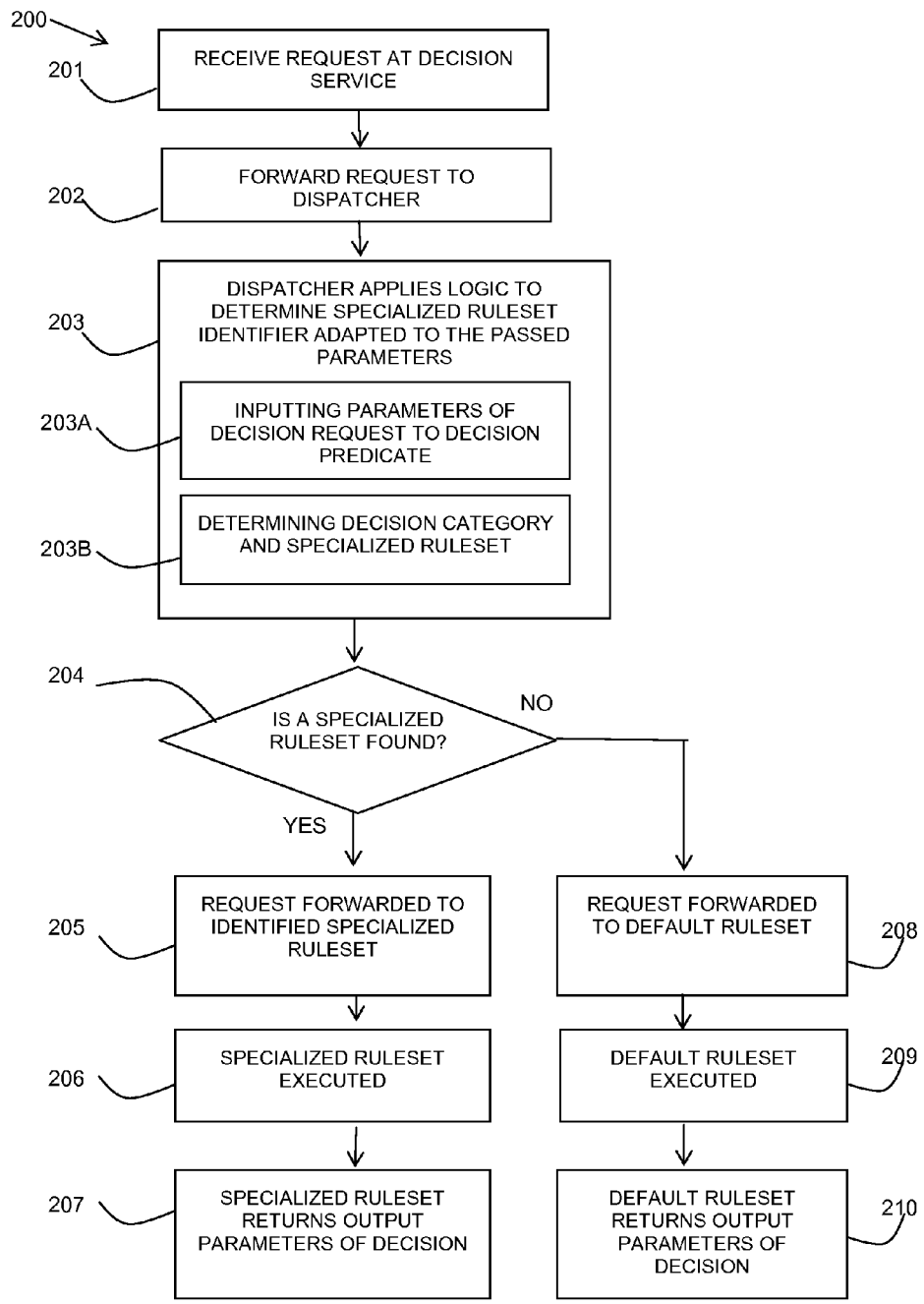
FIG. 2 is a flow diagram of an example embodiment of an aspect of a method in accordance with the present invention carried out at runtime.

Referring to FIG. 2, a flow diagram 200 shows an embodiment of the described method at runtime.

A request is received 201 at the decision service and processed. The request may be forwarded 202 to a dispatcher. The dispatcher applies 203 the dispatch logic to determine the specialized ruleset identifier adapted to the passed parameters. This may include inputting 203A one or more parameters of the decision request to a clustering predicate to produce a decision category; and determining 203B a specialized ruleset for the decision request based on the decision category.

It is determined 204 if a specialized ruleset is found. If a specialized ruleset is found, the request is forwarded 205 to the identified specialized ruleset for execution 206 of the business logic. The specialized ruleset returns 207 output parameters for this decision.

If a specialized ruleset is not found, the request is forwarded 208 to the default ruleset for execution 209 of the business logic. The default ruleset returns 210 output parameters for this decision. The default ruleset may be the unpartitioned ruleset.

The dispatcher may proceed with the following integration contract:
 As input—the decision request with a monolithic ruleset identifier and input parameters;
 As output—it returns the specialized ruleset identifier found based on the identified partition, or the default ruleset if no partition is found.

Figure 3:
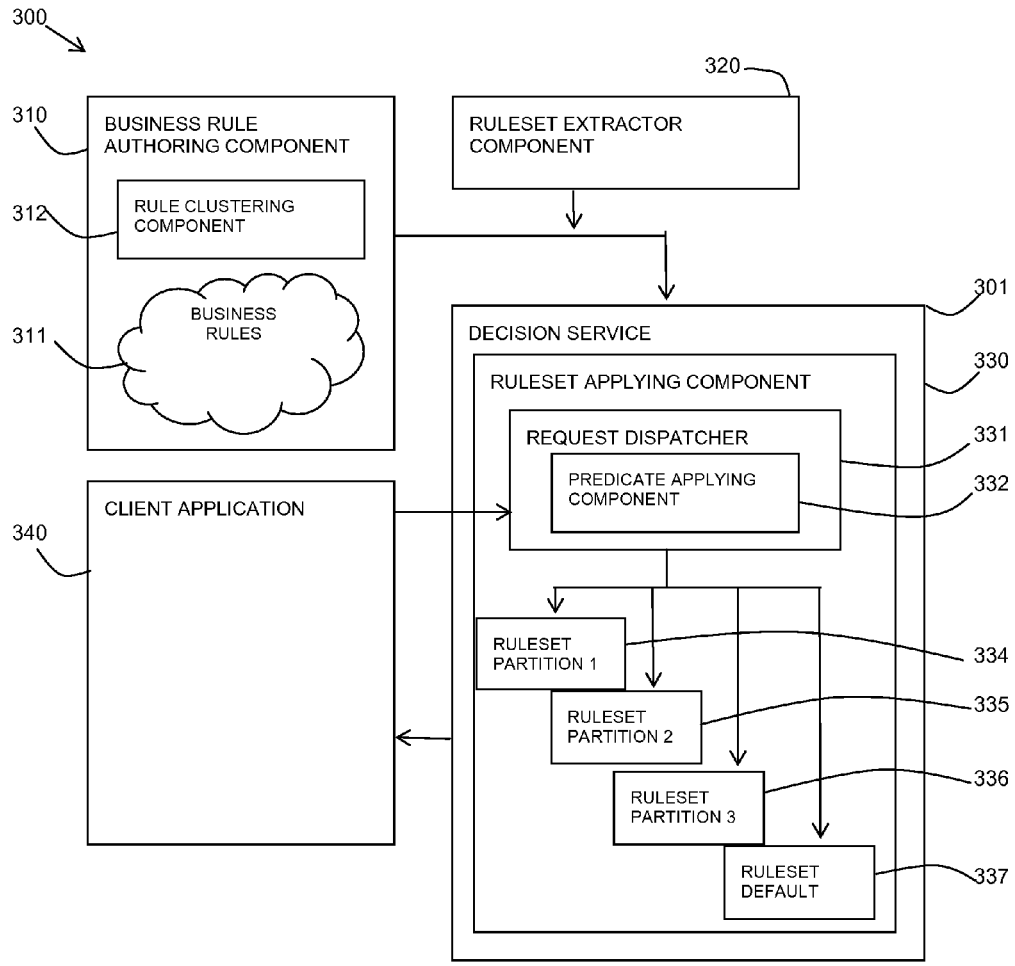
FIG. 3 is a block diagram of an example embodiment of a system in accordance with the present invention.

Referring to FIG. 3, a block diagram shows an example embodiment of the described system 300.

A business rule authoring component 310 may be provided with defined business rules 311 which may be authored by a business analyst. A rule clustering component 312 may be provided and the business analyst may provide clustering predicates to be applied to the business rules to enable clustering of business rules 311 into partitions or categories.

A ruleset extractor component 320 may be provided for extracting specialized rulesets 344-346 from the business rules 311 using the rule clustering component 312 and the predefined predicates.

A decision service 301 may be provided including a rule engine. The decision service 301 may include a ruleset applying component 330 with a request dispatcher 331. The request dispatcher 331 may receive decision requests from a client application 340.

The request dispatcher 331 may include a predicate applying component 332 for applying the clustering predicates to input parameters of a decision request to determine which, if any, of the defined specialized rulesets 334-336 or a default ruleset 337 should be used for a decision request.

The ruleset applying component 330 may include a package including:
 A decision request dispatcher 331;
 A set of specialized rulesets 334-336, one per decision partition; and
 A default monolithic ruleset 337, used if no specialized ruleset goes elected for a request These components may be made available on a machine or a cluster of machines.

Figure 4:
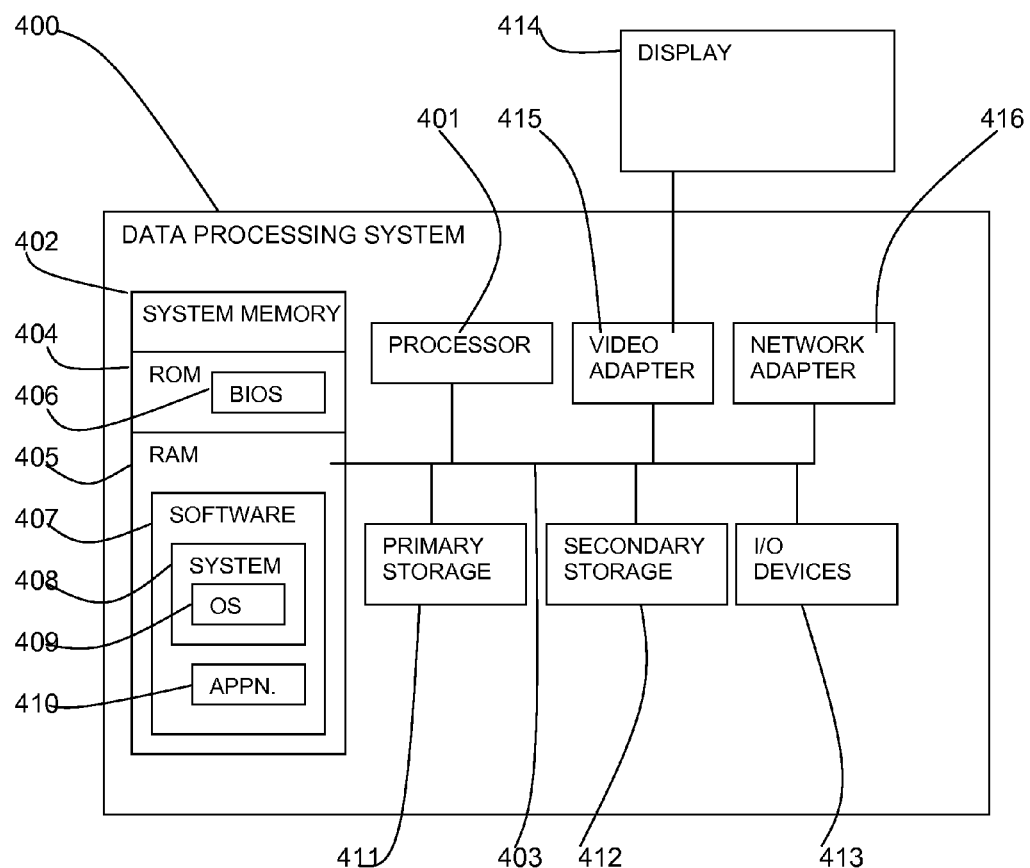
FIG. 4 is a block diagram of an embodiment of a computer system in which the present invention may be implemented.

Referring to FIG. 4, an exemplary system for implementing aspects of the invention includes a data processing system 400 suitable for storing and/or executing program code including at least one processor 401 coupled directly or indirectly to memory elements through a bus system 403. The memory elements may include local memory employed during actual execution of the program code, bulk storage, and cache memories which provide temporary storage of at least some program code in order to reduce the number of times code must be retrieved from bulk storage during execution.

The memory elements may include system memory 402 in the form of read only memory (ROM) 404 and random access memory (RAM) 405. A basic input/output system (BIOS) 406 may be stored in ROM 404. System software 407 may be stored in RAM 405 including operating system software 408. Software applications 410 may also be stored in RAM 405.

The system 400 may also include a primary storage means 411 such as a magnetic hard disk drive and secondary storage means 412 such as a magnetic disc drive and an optical disc drive. The drives and their associated computer-readable media provide non-volatile storage of computer-executable instructions, data structures, program modules and other data for the system 400. Software applications may be stored on the primary and secondary storage means 411, 412 as well as the system memory 402.

The computing system 400 may operate in a networked environment using logical connections to one or more remote computers via a network adapter 416.

Input/output devices 413 may be coupled to the system either directly or through intervening I/O controllers. A user may enter commands and information into the system 400 through input devices such as a keyboard, pointing device, or other input devices (for example, microphone, joy stick, game pad, satellite dish, scanner, or the like). Output devices may include speakers, printers, etc. A display device 414 is also connected to system bus 403 via an interface, such as video adapter 415.

The optimization provided by the described method and system may be explained as follows:
 Tests performed in the discriminating predicate incorporated in the request dispatcher are a tiny fraction of the whole ruleset job; therefore, performance is at worst totally unaffected.
 In the most common cases, when the user has chosen the right discriminating factors for his decision, considerable savings in start-up time, speed of decision service and memory usage are observed, as many tests are no more evaluated thanks to prefiltering.
 In consequence, the decision service evaluation cost per request is drastically reduced when the discriminating tests are accurately chosen (i.e. when they align with principal components of the input space) especially when requests are unbalanced across the decision categories.

The invention can take the form of an entirely hardware embodiment, an entirely software embodiment or an embodiment containing both hardware and software elements. In one embodiment, the invention is implemented in software, which includes but is not limited to firmware, resident software, microcode, etc.

Thus, as described herein and according to a first aspect of the present invention there is provided a method for rule execution in decision services, comprising: providing one or more specialized rulesets classified by decision partitions based on defined clustering predicates of decision service signatures for business rules; receiving a decision request from a client; inputting one or more parameters of the decision request to a clustering predicate based on decision service signatures to produce a decision category; determining a specialized ruleset for the decision request based on the decision category; forwarding the decision request for processing by the specialized ruleset; and returning a decision output from the specialized ruleset.

The method may include: defining a clustering predicate at business rules authoring time; analyzing business rules to identify decision partitions based on the clustering predicate and to classify the business rules per decision partition to form specialized rulesets.

The method may further include: providing a default ruleset; determining if no specialized ruleset for the request is found based on the parameters of the request; forwarding the decision request for processing by the default ruleset; returning a decision output from the default ruleset. The default ruleset may be a full ruleset from which the specialized rulesets have been partitioned.

The method may include manually extending decision partitions for specialized rulesets.

The method may include simplifying business rules by partition by factorizing predicate tests that apply to the partition.

Analyzing business rules to identify decision partitions, may include: scanning all business rules for all conditions in the business rules; scanning all conditions for all tests performed on a partition; adding a partition; adding a test to the partition; adding test to default partition. Analyzing business rules to identify decision partitions may further include: for all partitions including a default, and for all business rules with a test in a partition: subtracting the test from the business rule; adding the business rule to the specialized ruleset. Analyzing business rules to identify decision partitions may further include: removing rules that test against another value. Analyzing business rules to identify decision partitions may include reordering tests, conditions and rules.

Providing one or more specialized rulesets classified by decision partitions based on clustering predicates for business rules may include: partitioning the one or more specialized rulesets by decomposing a monolithic multi-purpose ruleset.

According to a second aspect of the present invention there is provided a system for rule execution in decision services, comprising: one or more specialized rulesets classified by decision partitions based on clustering predicates of decision service signatures for business rules; a request dispatcher for: receiving a decision request from a client; inputting one or more parameters of the decision request to a clustering predicate based on decision service signatures to produce a decision category; determining a specialized ruleset for the decision request based on the decision category; forwarding the decision request for processing by the specialized ruleset; and returning a decision output from the specialized ruleset.

The system may include: a business rule authoring component for defining a clustering predicate at business rules authoring time; a ruleset extractor component for analyzing business rules to identify decision partitions based on the clustering predicate and to classify the business rules per decision partition to form specialized rulesets.

The system may include: providing a default ruleset; and wherein the request dispatcher is for: determining if no specialized ruleset for the request is found based on the parameters of the request; forwarding the decision request for processing by the default ruleset; and returning a decision output from the default ruleset. The default ruleset may be a full ruleset from which the specialized rulesets have been partitioned.

According to a third aspect of the present invention there is provided a computer program product for rule execution in decision services, the computer program product comprising a computer readable storage medium having computer-readable program code embodied therewith, the computer-readable program code configures to: provide one or more specialized rulesets classified by decision partitions based on defined clustering predicates of decision service signatures for business rules; receive a decision request from a client; input one or more parameters of the decision request to a clustering predicate based on decision service signatures to produce a decision category; determine a specialized ruleset for the decision request based on the parameters of the request; forward the decision request for processing by the specialized ruleset; and return a decision output from the specialized ruleset.

According to a fourth aspect of the present invention there is provided a method substantially as described with reference to the figures.

According to an fifth aspect of the present invention there is provided a system substantially as described with reference to the figures.

The described aspects of the invention provide the advantage of enabling the processing of a decision request by a tailored and smaller decision ruleset which is more efficient than the multipurpose monolithic ruleset.

Improvements and modifications can be made to the foregoing without departing from the scope of the present invention.

The invention claimed is:

1. A method for rule execution in decision services, comprising:
    providing, by one or more processors, one or more specialized rulesets classified by decision partitions based on defined clustering predicates of decision service signatures for business rules, wherein a clustering predicate is a function that determines a decision category based on parameters that are input into the function, wherein the clustering predicate is based on the decision service signature, wherein the decision service signatures define input parameters and output parameters for a decision service, wherein the decision service is an autonomous component that receives decision requests and return decision outputs;
    receiving, by one or more processors, a decision request from a client, wherein the decision service redirects the decision request to a particular set of business rules;
    inputting, by one or more processors, one or more parameters of the decision request to a clustering predicate based on the decision service signatures to produce the decision category;
    determining, by one or more processors, a specialized ruleset for the decision request based on the decision category;
    forwarding, by one or more processors, the decision request for processing by the specialized ruleset;
    returning, by one or more processors, a decision output from the specialized ruleset;
    defining, by one or more processors, the clustering predicate at business rules authoring time;
    analyzing, by one or more processors, business rules to identify decision partitions based on the clustering predicate and to classify the business rules per decision partition to form specialized rulesets, wherein said analyzing the business rules includes:
  scanning, by one or more processors, all business rules for all conditions in the business rules;
  scanning, by one or more processors, all conditions for all tests performed on the decision partitions;
  adding, by one or more processors, a new decision partition;
  adding a test to the new decision partition; and
  adding the test to a default decision partition.

2. The method as claimed in claim 1, further comprising:
providing a default ruleset;
determining, by one or more processors, if no specialized ruleset for the decision request is found based on the parameters of the decision request;
forwarding, by one or more processors, the decision request for processing by the default ruleset;
returning, by one or more processors, a decision output from the default ruleset.

3. The method as claimed in claim 2, wherein the default ruleset is a full ruleset from which the specialized rulesets have been partitioned.

4. The method as claimed in claim 1, further comprising:
manually extending decision partitions for specialized rulesets.

5. The method as claimed in claim 1, further comprising:
simplifying, by one or more processors, business rules by partition by factorizing predicate tests that apply to the partition.

6. The method as claimed in claim 1, wherein analyzing business rules to identify decision partitions includes:
  for all partitions including a default, and for all business rules with a test in a partition:
    subtracting, by one or more processors, the test from the business rule;
    adding, by one or more processors, the business rule to the specialized ruleset.

7. The method as claimed in claim 1, wherein analyzing business rules to identify decision partitions includes:
  removing, by one or more processors, rules that test against another value.

8. The method as claimed in claim 1, wherein analyzing business rules to identify decision partitions includes:
  reordering, by one or more processors, tests, conditions and rules.

9. The method as claimed in claim 1, wherein providing one or more specialized rulesets classified by decision partitions based on clustering predicates for business rules includes:
  partitioning, by one or more processors, the one or more specialized rulesets by decomposing a monolithic multi-purpose ruleset.

10. A system for rule execution in decision services, the system comprising:
  a processor, a computer readable memory, and a computer readable storage media;
  first program instructions to provide one or more specialized rulesets classified by decision partitions based on defined clustering predicates of decision service signatures for business rules, wherein a clustering predicate is a function that determines a decision category based on parameters that are input into the function, wherein the clustering predicate is based on the decision service signature, wherein the decision service signatures define input parameters and output parameters for a decision service, wherein the decision service is an autonomous component that receives decision requests and return decision outputs;
  second program instructions to receive a decision request from a client, wherein the decision service redirects the decision request to a particular set of business rules;
  third program instructions to input one or more parameters of the decision request to a clustering predicate based on decision service signatures to produce the decision category;
  fourth program instructions to determine a specialized ruleset for the decision request based on the decision category;
  fifth program instructions to forward the decision request for processing by the specialized ruleset;
  sixth program instructions to return a decision output from the specialized ruleset;
  seventh program instructions to define the clustering predicate at business rules authoring time;
  eighth program instructions to analyze business rules to identify decision partitions based on the clustering predicate and to classify the business rules per decision partition to form specialized rulesets, wherein said analyzing the business rules includes:
    scanning all business rules for all conditions in the business rules;
    scanning all conditions for all tests performed on the decision partitions;
    adding a new decision partition;
    adding a test to the new decision partition; and
    adding the test to a default decision partition; and wherein said first, second, third, fourth, fifth, sixth, seventh and eighth program instructions are stored on said computer readable storage media for execution by said processor via said computer readable memory.

11. The system as claimed in claim 10, further comprising:
  ninth program instructions to provide a default ruleset;
  tenth program instructions to determine if no specialized ruleset for the decision request is found based on the parameters of the decision request;
  eleventh program instructions to forward the decision request for processing by the default ruleset; and
  twelfth program instructions to return a decision output from the default ruleset; and wherein
said ninth, tenth, eleventh, and twelfth program instructions are stored on said computer readable storage media for execution by said processor via said computer readable memory.

12. The system as claimed in claim 11, wherein the default ruleset is a full ruleset from which the specialized rulesets have been partitioned.

13. A computer program product for rule execution in decision services, the computer program product comprising a non-transitory computer readable storage medium having computer-readable program code embodied therewith, the computer-readable program code configured to:
  provide one or more specialized rulesets classified by decision partitions based on defined clustering predicates of decision service signatures for business rules, wherein a clustering predicate is a function that determines a decision category based on parameters that are input into the function, wherein the clustering predicate is based on the decision service signature, wherein the decision service signatures define input parameters and output parameters for a decision service, wherein the decision service is an autonomous component that receives decision requests and return decision outputs;

receive a decision request from a client, wherein the decision service redirects the decision request to a particular set of business rules;

input one or more parameters of the decision request to a clustering predicate based on decision service signatures to produce the decision category;

determine a specialized ruleset for the decision request based on the decision category;

forward the decision request for processing by the specialized ruleset;

return a decision output from the specialized ruleset;

define the clustering predicate at business rules authoring time;

analyze business rules to identify decision partitions based on the clustering predicate and to classify the business rules per decision partition to form specialized rulesets, wherein said analyzing the business rules includes:

scanning all business rules for all conditions in the business rules;

scanning all conditions for all tests performed on the decision partitions;

adding a new decision partition;

adding a test to the new decision partition; and adding the test to a default decision partition.

14. The computer program product of claim 13, wherein the computer-readable program code is further configured to:

provide a default ruleset;

determine if no specialized ruleset for the decision request is found based on the parameters of the decision request;

forward the decision request for processing by the default ruleset;

return a decision output from the default ruleset.

15. The computer program product of claim 14, wherein the default ruleset is a full ruleset from which the specialized rulesets have been partitioned.

16. The computer program product of claim 13, wherein the computer-readable program code is further configured to:

simplify business rules by partition by factorizing predicate tests that apply to the partition.

* * * * *